(12) United States Patent
Kunt

(10) Patent No.: US 11,570,812 B2
(45) Date of Patent: Jan. 31, 2023

(54) CONDITIONS ON LISTEN-BEFORE-TALK IMPACT ON MAC COUNTERS IN MOBILE COMMUNICATIONS

(71) Applicant: MediaTek Singapore Pte. Ltd., Singapore (SG)

(72) Inventor: Mehmet Kunt, Cambridge (GB)

(73) Assignee: MediaTek Singapore Pte. Ltd., Singapore (SG)

(*) Notice: Subject to any disclaimer, the term of this patent is extended or adjusted under 35 U.S.C. 154(b) by 42 days.

(21) Appl. No.: 17/213,208

(22) Filed: Mar. 25, 2021

(65) Prior Publication Data
US 2021/0337592 A1  Oct. 28, 2021

Related U.S. Application Data

(60) Provisional application No. 63/014,156, filed on Apr. 23, 2020.

(51) Int. Cl.
*H04W 4/00* (2018.01)
*H04W 74/08* (2009.01)

(52) U.S. Cl.
CPC .......... *H04W 74/0808* (2013.01); *H04W 74/0833* (2013.01)

(58) Field of Classification Search
CPC .............. H04W 74/0808; H04W 74/0833
See application file for complete search history.

(56) References Cited

U.S. PATENT DOCUMENTS

| 2020/0221495 A1* | 7/2020 | Chen | H04W 72/044 |
| 2021/0100031 A1* | 4/2021 | Cirik | H04W 24/04 |

OTHER PUBLICATIONS

3GPP RAN WG2 Meeting #107bis, "Handling UL LBT Failures in MAC", Oct. 14-18, 2019, R2-1912889 (Year: 2019).*
Taiwan Intellectual Property Office, Office Action for Taiwan Patent Application No. 110113331, dated Dec. 22, 2021.
Vivo, "LBT Impacts on 2-step RACH", 3GPP TSG-RAN WG2 Meeting #107bis, R2-1912179, Chongqing, China, Oct. 14-18, 2019.
Intel Corporation, "Detecting and Handling of UL LBT failures", 3GPP TSG-RAN WG2 107bis, R2-1912625, Chongqing, China, Oct. 14-18, 2019.
Interdigital, "Handling UL LBT Failures in MAC", 3GPP RAN WG2 Meeting #107bis, R2-1912889, Chongqing, China, 14-18 2019.
Mediatek Inc., "MAC behaviour for LBT failures in Msg3 transmissions", 3GPP TSG-RAN WG2 Meeting #107bis, R2-1913263, Chongqing, China, Oct. 14-18, 2019.

* cited by examiner

*Primary Examiner* — Siren Wei
(74) *Attorney, Agent, or Firm* — Han IP PLLC; Andy M. Han

(57) ABSTRACT

Various schemes pertaining to conditions on LBT impact on MAC counters in mobile communications involve a user equipment (UE) determining a status of a listen-before-talk (LBT) failure detection and recovery feature. Based on the status of the LBT failure detection and recovery feature (e.g., whether the LBT failure detection and recovery feature is configured or not configured), a preamble transmission counter in a random access (RA) procedure or a scheduling request (SR) counter in a SR procedure is conditionally incremented in the event of an LBT failure.

16 Claims, 9 Drawing Sheets

CONDITIONS ON LISTEN-BEFORE-TALK IMPACT ON MAC COUNTERS IN MOBILE COMMUNICATIONS

CROSS REFERENCE TO RELATED PATENT APPLICATION(S)

The present disclosure is part of a non-provisional application claiming the priority benefit of U.S. Patent Application No. 63/014,156, filed on 23 Apr. 2020, the content of which being incorporated by reference in its entirety.

TECHNICAL FIELD

The present disclosure is generally related to mobile communications and, more particularly, to techniques pertaining to conditions on listen-before-talk (LBT) impact on medium access control (MAC) counters in mobile communications.

BACKGROUND

Unless otherwise indicated herein, approaches described in this section are not prior art to the claims listed below and are not admitted as prior art by inclusion in this section.

In wireless communications such as mobile communications, LBT failure detection and recovery procedure (LFDRP) has been developed in Release 16 (Rel-16) of the $3^{rd}$ Generation Partnership Project (3GPP) specification for 5th Generation (5G) New Radio (NR)-based access to unlicensed spectrum (NR-U). The objective of this procedure is to detect when a user equipment (UE) is experiencing an excessive amount of LBT failures for uplink (UL) transmissions and to take recovery actions. The detection mechanism involves starting/restarting a timer and incrementing a counter when a MAC layer at the UE receives an LBT failure indication from a lower layer and, if the counter value reaches a maximum count threshold, a consistent LBT failure status is triggered and recovery actions are taken with the counter reset to zero. On the other hand, the counter is reset to zero when the timer expires, or if the timer or the maximum count threshold is reconfigured by upper layer(s), or if consistent LBT failure status is canceled. The configuration is provided to the UE by a network in an IbtFailureRecoveryConfig information element (IE). Support for LFDRP is optional in the UE and is indicated by a UE capability. LBT failure detection applies to all UL transmissions including transmission during random access (RA) and scheduling request (SR). Additionally, some changes were introduced in the MAC layer regarding the preamble and SR counters when LBT failure indication is received from lower layers. For RA, the MAC layer does not increment the PREAMBLE_TRANSMISSION_COUNTER if LBT failure indication is received from lowers layer for the last RA preamble transmission (in a 4-step RA) or the last MsgA RA preamble transmission (in a 2-step RA). For SR, the MAC layer does not increment the SR_COUNTER if LBT failure indication is received from lower layers.

In case that LBT failures keeps on occurring during RA preamble (or MsgA) or SR transmissions, the counter would not be incremented and the maximum count threshold would not be reached. This would prevent the MAC layer from executing the recovery actions within the RA or SR procedure. In this case, the LBT failure recovery and detection mechanism is expected to take over to detect the presence of consistent LBT failures and take any recovery action(s) as necessary. However, the LFDRP configuration may not always be present, for example it will not be present at initial access, or when the LFDRP is not supported by the UE or not configured by the network. If the LFDRP configuration is not present and LBT failures are consistently encountered for RA preamble, MsgA, or SR transmissions at the MAC layer in the UE, the MAC layer will get stuck in the RA or SR procedure without taking any recovery actions. Therefore, there is a need for a solution to address this issue.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

One objective of the present disclosure is to propose various schemes, concepts, designs, techniques, methods and apparatuses to address the aforementioned issue. In particular, the present disclosure aims to provide schemes and designs pertaining to conditions on LBT impact on MAC counters in mobile communications.

In one aspect, a method may involve a processor of an apparatus, implemented in a UE, determining a status of an LBT failure detection and recovery feature. The method may also involve the processor conditionally incrementing a counter in a procedure based on the status of the LBT failure detection and recovery feature. The status may be determined based on whether the LBT failure detection and recovery feature is configured or not configured.

In another aspect, a method may involve a processor of an apparatus, implemented in a UE, determining a status of an LBT failure detection and recovery feature. The method may also involve the processor conditionally incrementing a preamble transmission counter in a RA procedure based on the status of the LBT failure detection and recovery feature.

In yet another aspect, a method may involve a processor of an apparatus, implemented in a UE, determining a status of an LBT failure detection and recovery feature. The method may also involve the processor conditionally incrementing a SR counter in a SR procedure based on the status of the LBT failure detection and recovery feature.

It is noteworthy that, although description provided herein may be in the context of certain radio access technologies, networks and network topologies such as 5G/NR mobile networking, the proposed concepts, schemes and any variation(s)/derivative(s) thereof may be implemented in, for and by other types of wireless and wired communication technologies, networks and network topologies such as, for example and without limitation, Ethernet, Evolved Packet System (EPS), Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT), Industrial Internet-of-Things (IIoT), Narrow Band Internet of Things (NB-IoT), and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to conditions on LBT impact on MAC counters in mobile communications. According to the present disclosure, a number of possible solutions may be implemented separately or jointly. That is, although these possible solutions may be described below separately, two or more of these possible solutions may be implemented in one combination or another.

Figure 1:
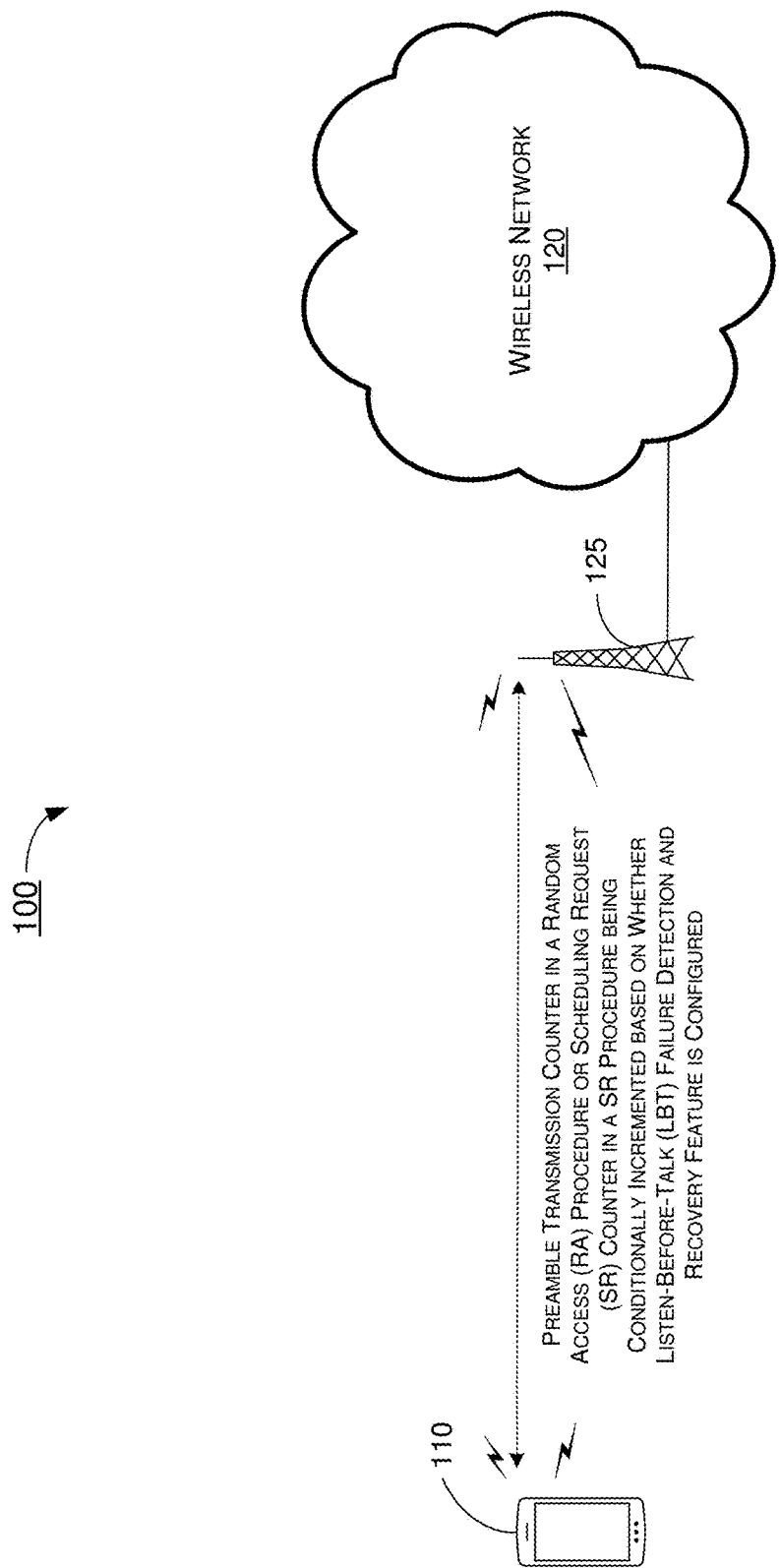
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. Referring to FIG. 1, network environment 100 may involve a UE 110 in wireless communication with a wireless network 120 (e.g., a 5G NR mobile network). UE 110 may be in wireless communication with wireless network 120 via a base station or network node 125 (e.g., an eNB, gNB or transmit-receive point (TRP)). In network environment 100, UE 110 and wireless network 120 may implement various schemes pertaining to conditions on LBT impact on MAC counters in mobile communications in accordance with the present disclosure, as described herein in the contexts of FIG. 2~FIG. 5.

Figure 2:
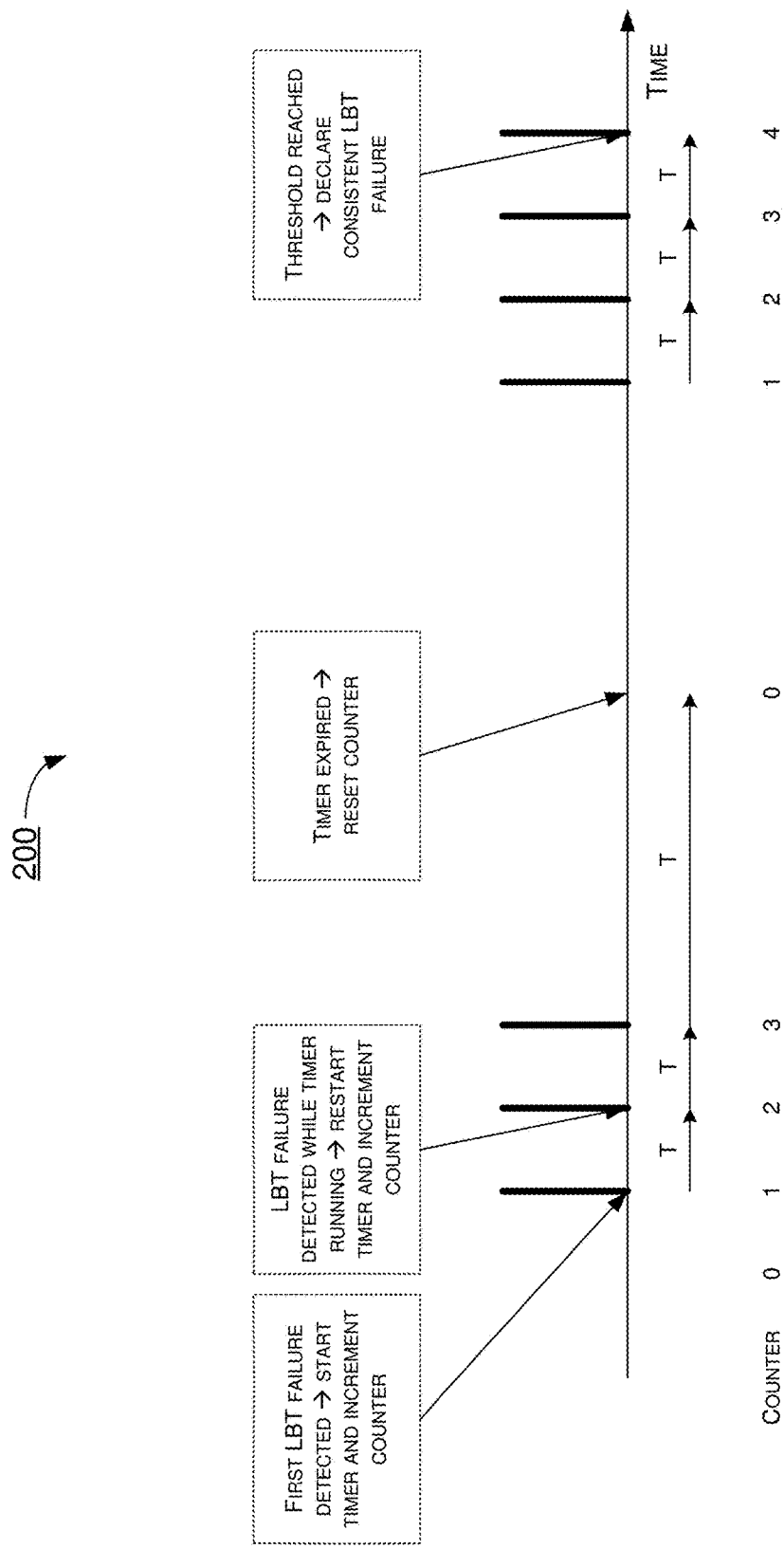
FIG. 2 is a diagram of an example scenario in accordance with an implementation of the present disclosure.

FIG. 2 illustrates an example scenario 200 in accordance with an implementation of the present disclosure. In particular, scenario 200 illustrates a mechanism utilizing an LFDRP counter plus a timer. In scenario 200, when an LBT failure is detected initially, UE 110 may start a timer and increment a counter. As more LBT failures are detected while the timer is running, the UE may restart the timer and increment the counter. When the timer expires, the UE may reset the counter. When a maximum counter threshold is reached, the UE may determine that consistent LBT failure has occurred.

It is noteworthy that LBT failure detection applies to all UL transmissions including transmission during random access (RA) and scheduling request (SR). Additionally, some changes were introduced in the MAC layer regarding the preamble and SR counters when LBT failure indication is received from lower layers. For RA, the MAC layer does not increment the PREAMBLE_TRANSMISSION_COUNTER if LBT failure indication is received from lowers layer for the last RA preamble transmission (in a 4-step RA) or the last MsgA RA preamble transmission (in a 2-step RA). For SR, the MAC layer does not increment the SR_COUNTER if LBT failure indication is received from lower layers.

Figure 3:
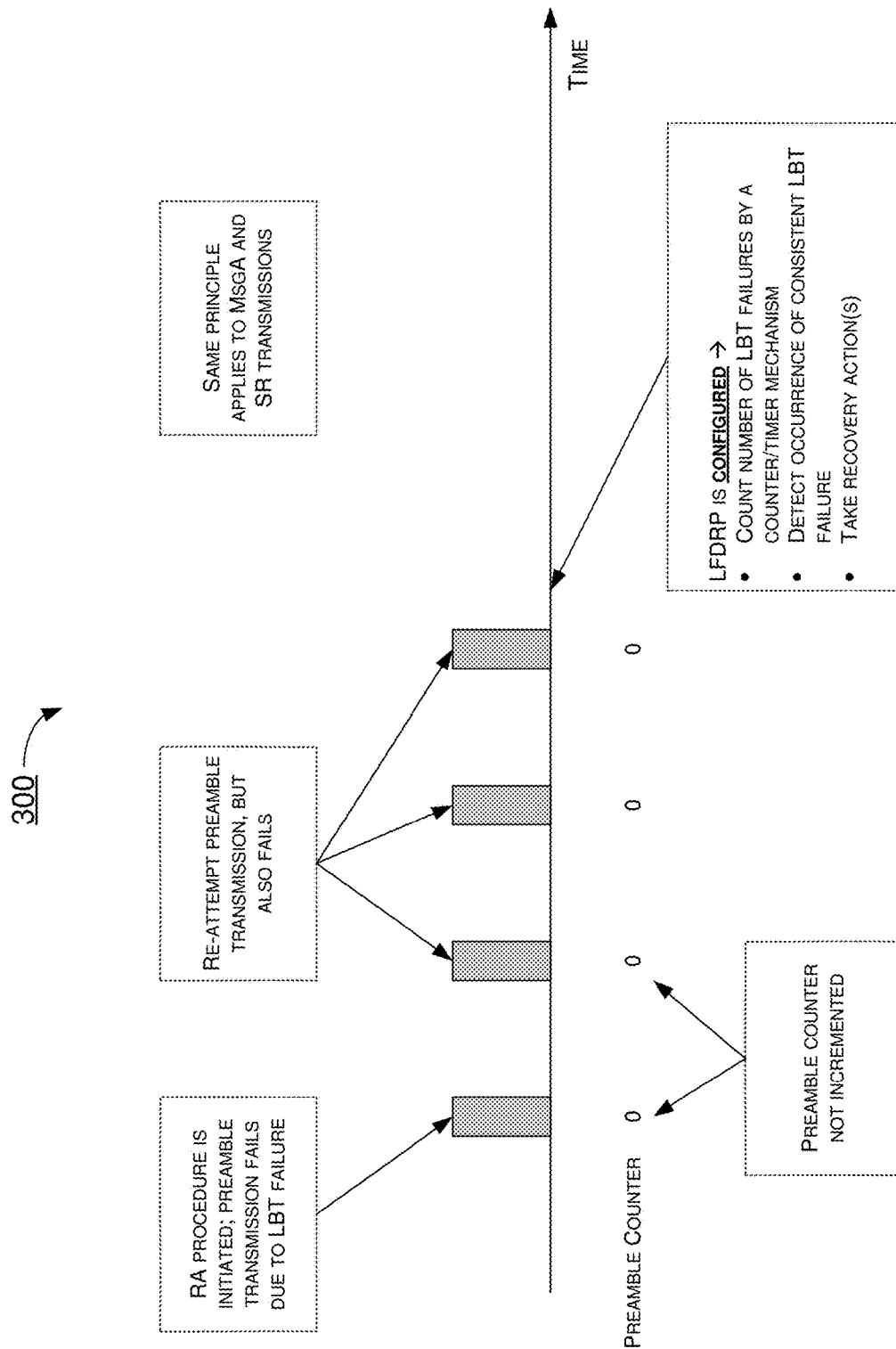
FIG. 3 is a diagram of an example scenario in accordance with an implementation of the present disclosure.

FIG. 3 illustrates an example scenario 300 in accordance with an implementation of the present disclosure. Specifically, scenario 300 illustrates a situation in which, in an event that the LBT failures keep occurring during transmissions of RA preamble/MsgA or SR, the preamble counter would not be incremented and, as a result, the maximum count threshold of the counter would not be reached. This would prevent the MAC layer from executing recovery actions within the RA or SR procedure. In this case, the LBT failure recovery and detection mechanism is expected to take over to detect the presence/occurrence of consistent LBT failures to take recovery action(s) as necessary. In scenario 300, when a RA procedure is initiated, preamble transmission fails due to LBT failure. Then, preamble transmission is re-attempted but also fails. On the other hand, the preamble counter is not incremented. In scenario 300, as the LFDRP is configured, the number of LBT failures is counted by a counter/timer mechanism to detect occurrence of consistent LBT failures in order to take recovery action(s). The same principle may apply to MsgA and SR transmissions.

It is noteworthy that, at initial access, the configuration for LDFRP is not present because the Ibt-FailureRecoveryConfig IE is not included in any system information block (SIB), and there is no default configuration for Ibt-FailureRecoveryConfig with Ibt-FailureRecoveryConfig being a part of BWP-UplinkDedicated. Moreover, after initial access, UE 110 or network 120 may not support LFDRP or network 120 may choose not to configure LFDRP. That is, Ibt-FailureRecoveryConfig may be optional and support of Ibt-FailureRecoveryConfig may be a UE capability.

It is also noteworthy that, in an event that LFDRP is not configured, the MAC layer at UE 110 may get stuck in a RA or SR procedure upon occurrence of consistent LBT failures. This is because the counters would not be incremented and the counters would never reach their maximum count thresholds. As a result, the MAC layer of UE 110 would continue to attempt transmissions of preamble/MsgA/SR indefinitely. Consequently, the MAC layer would be prevented from taking any recovery action (e.g., reporting a RA problem to upper layers of UE 110, initiating a RA procedure after SR failure, and so on) in case of consistent LBT failures encountered during RA or SR procedures. That is, recovery actions would not be triggered either as part of the RA/SR procedure or as part of LFDRP. This is shown in FIG. 4.

Figure 4:
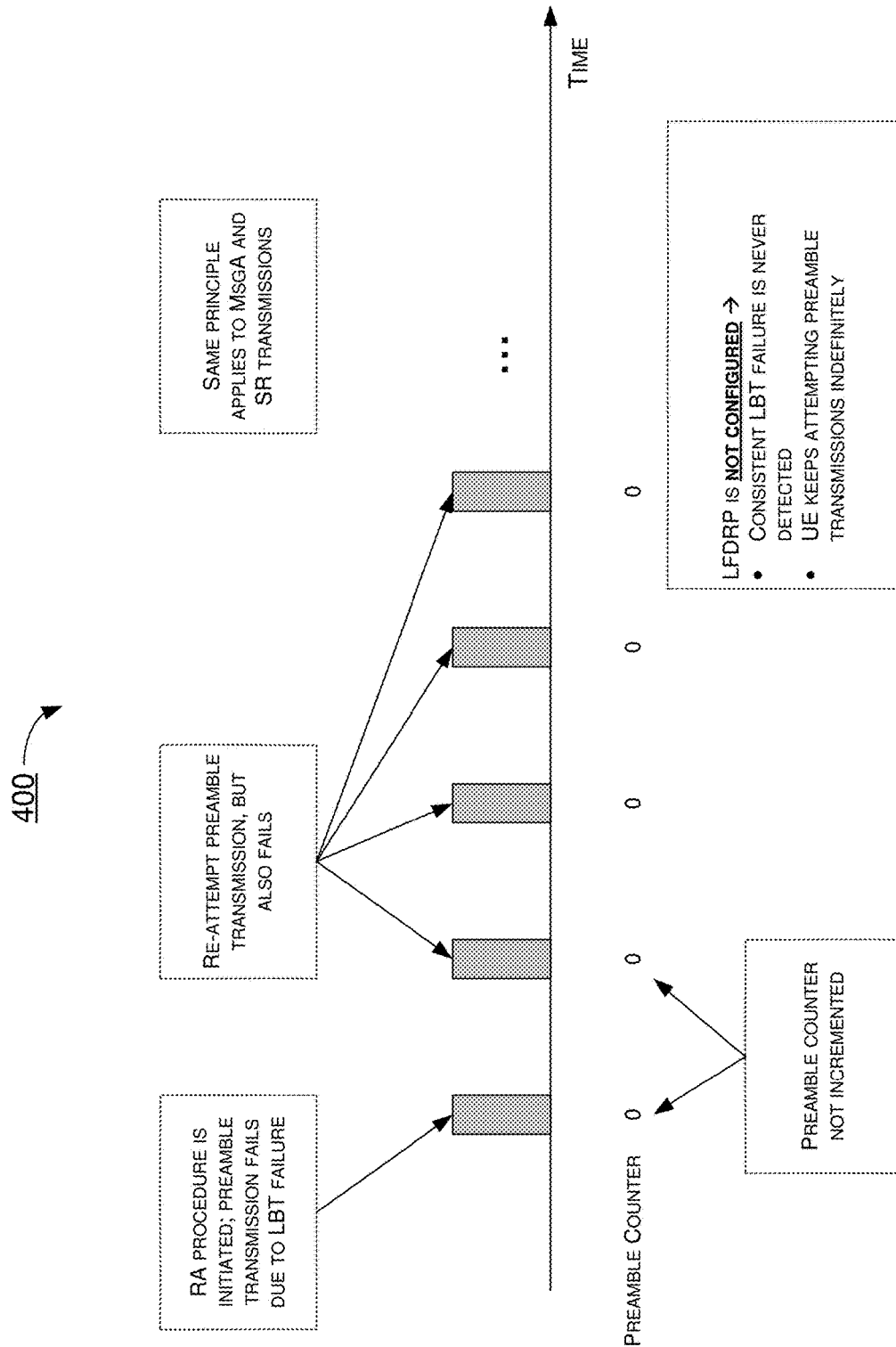
FIG. 4 is a diagram of an example scenario illustrating a problem with a current system without an implementation of the present disclosure.

FIG. 4 illustrates an example scenario 400 illustrating a problem with a current system without implementation of the present disclosure. In scenario 400, when a RA procedure is initiated, preamble transmission fails due to LBT failure. Then, preamble transmission is re-attempted but also fails. On the other hand, the preamble counter is not incremented. In scenario 400, as the LFDRP is not configured, the number of LBT failures is never counted and, as a result, UE 110 would keep attempting preamble transmissions indefinitely. The same principle may apply to MsgA and SR transmissions.

Under a proposed scheme in accordance with the present disclosure, LBT failure indications from lower layers may be considered in the MAC layer when incrementing the PREAMBLE_TRANSMISSION_COUNTER and SR_COUNTER, depending on whether the LFDRP (lbt-FailureRecoveryConfig) is configured or not. In case that lbt-FailureRecoveryConfig is not configured, the MAC layer may ignore the LBT failure indications from lower layers when determining whether to increment the preamble transmission counter and SR counter or not. That is, under the proposed scheme, for a RA procedure, the MAC layer may not increment the PREAMBLE_TRANSMISSION_ COUNTER in an event that lbt-FailureRecoveryConfig is configured and LBT failure indication is received from lower layers for the last random access preamble transmission (for a 4-step RA) or for the last MsgA random access preamble transmission (for a 2-step RA). Moreover, under the proposed scheme, the MAC layer may not increment the SR_COUNTER in an event that lbt-FailureRecoveryConfig is configured and LBT failure indication is received from lower layers.

Figure 5:
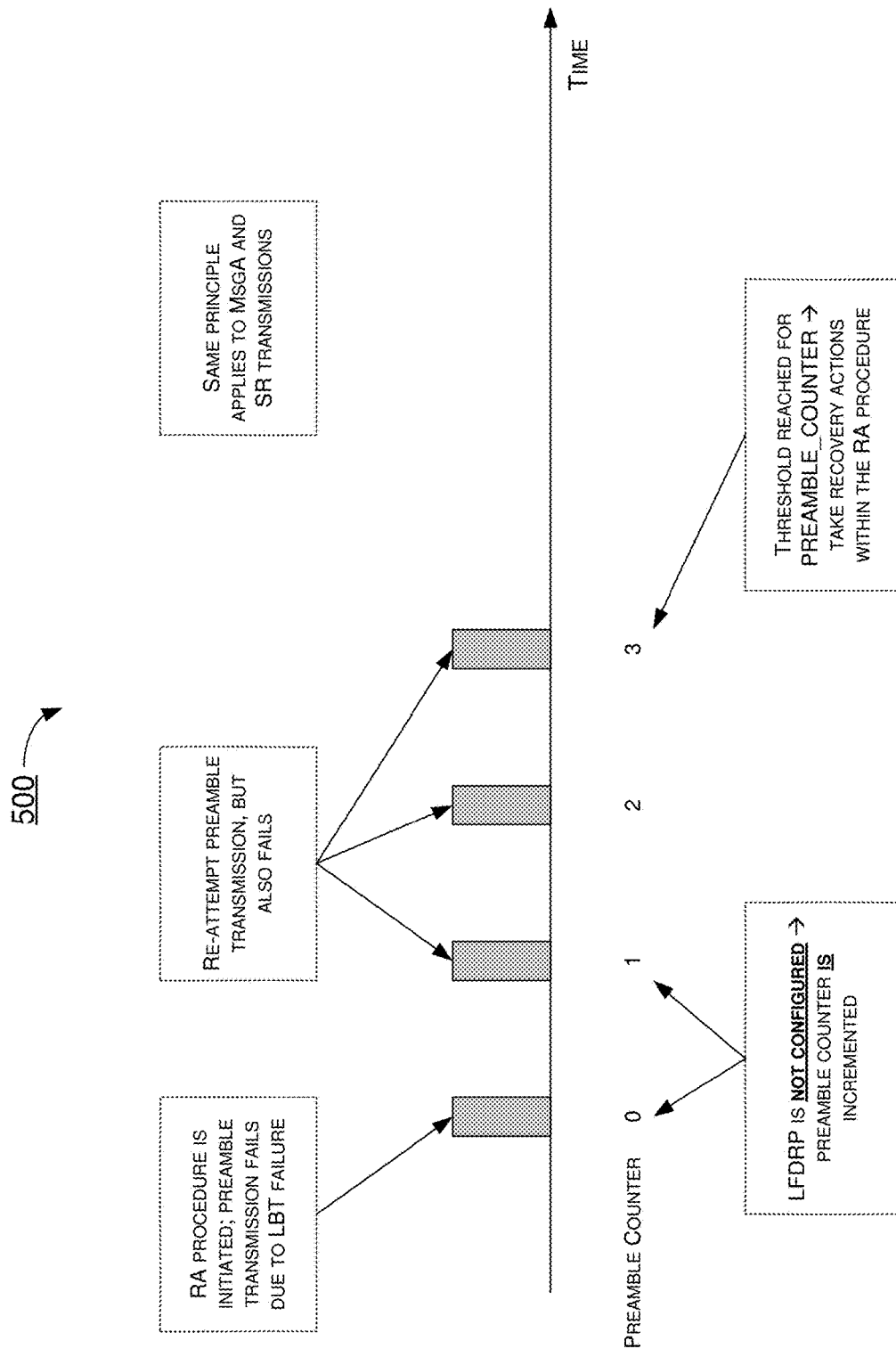
FIG. 5 is a diagram of an example scenario in accordance with an implementation of the present disclosure.

FIG. 5 illustrates an example scenario 500 in accordance with an implementation of the present disclosure. Under a proposed scheme in accordance with the present disclosure, when LFDRP is not configured, the preamble counter may be incremented even in case of LBT failure for preamble transmission. The same principle may apply to MsgA and SR transmissions. Referring to FIG. 5, when a RA procedure is initiated, preamble transmission fails due to LBT failure. Then, preamble transmission is re-attempted but also fails. Meanwhile, as LFDRP is not configured, the preamble counter is incremented. Eventually, as the number of preamble transmission attempts is counted by the preamble counter, the maximum count threshold is reached for PREAMBLE COUNTER. Accordingly, recovery action(s) may be taken within the RA procedure.

Illustrative Implementations

Figure 6:
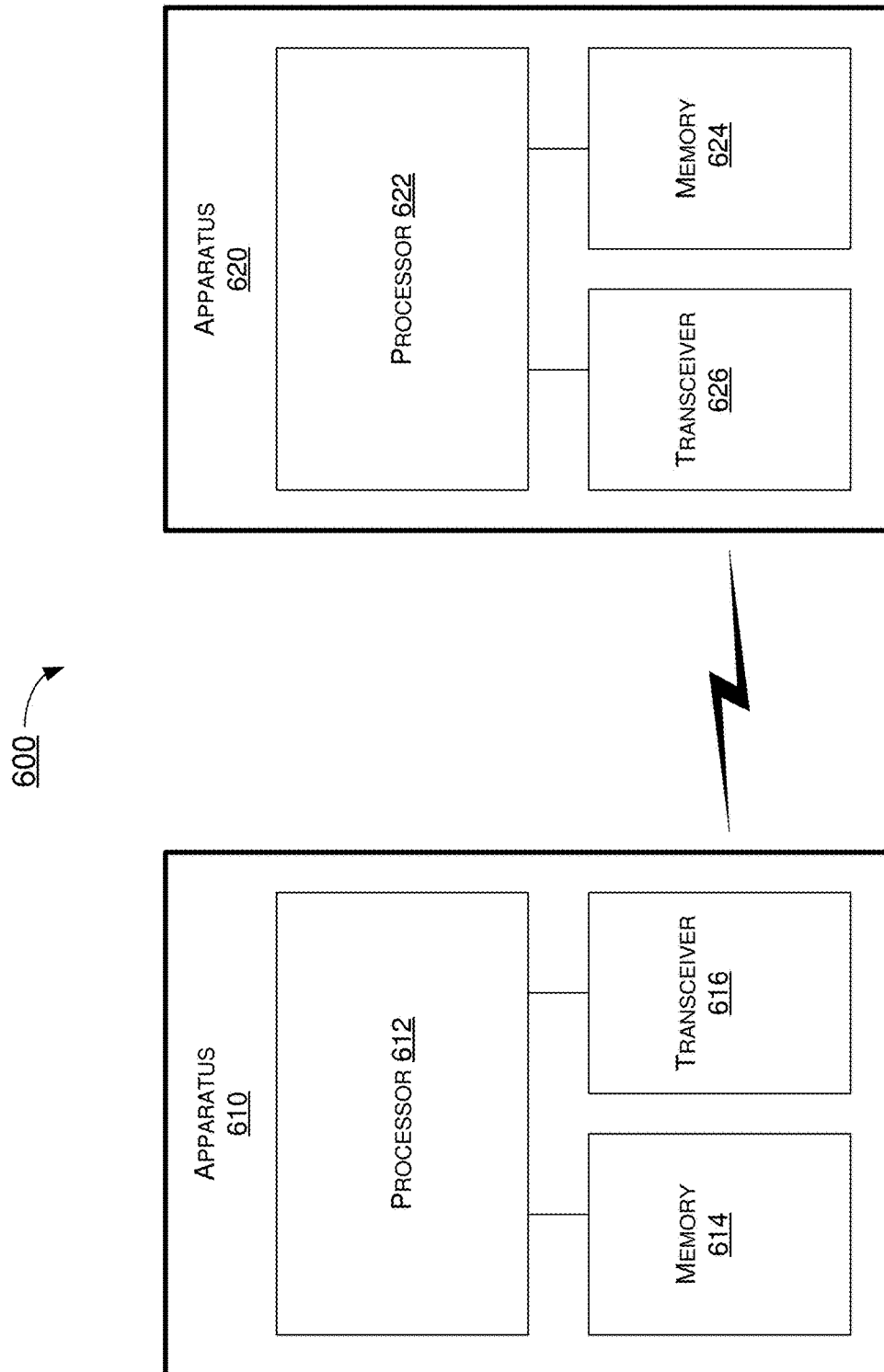
FIG. 6 is a block diagram of an example communication system in accordance with an implementation of the present disclosure.

FIG. 6 illustrates an example communication system 600 having at least an example apparatus 610 and an example apparatus 620 in accordance with an implementation of the present disclosure. Each of apparatus 610 and apparatus 620 may perform various functions to implement schemes, techniques, processes and methods described herein pertaining to conditions on LBT impact on MAC counters in mobile communications, including the various schemes described above with respect to various proposed designs, concepts, schemes, systems and methods described above, including network environment 100, as well as processes described below.

Each of apparatus 610 and apparatus 620 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 610 and apparatus 620 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 610 and apparatus 620 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 610 and apparatus 620 may be implemented in a smart thermostat, a smart fridge, a smart door lock, a wireless speaker or a home control center. When implemented in or as a network apparatus, apparatus 610 and/or apparatus 620 may be implemented in an eNodeB in an LTE, LTE-Advanced or LTE-Advanced Pro network or in a gNB or TRP in a 5G network, an NR network or an IoT network.

In some implementations, each of apparatus 610 and apparatus 620 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 610 and apparatus 620 may be implemented in or as a network apparatus or a UE. Each of apparatus 610 and apparatus 620 may include at least some of those components shown in FIG. 6 such as a processor 612 and a processor 622, respectively, for example. Each of apparatus 610 and apparatus 620 may further include one or more other components not pertinent to the proposed scheme of the present disclosure (e.g., internal power supply, display device and/or user interface device), and, thus, such component(s) of apparatus 610 and apparatus 620 are neither shown in FIG. 6 nor described below in the interest of simplicity and brevity.

In one aspect, each of processor 612 and processor 622 may be implemented in the form of one or more single-core processors, one or more multi-core processors, or one or more CISC or RISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including those pertaining to conditions on LBT impact on MAC counters in mobile communications in accordance with various implementations of the present disclosure.

In some implementations, apparatus 610 may also include a transceiver 616 coupled to processor 612. Transceiver 616 may be capable of wirelessly transmitting and receiving data. In some implementations, transceiver 616 may be capable of wirelessly communicating with different types of wireless networks of different radio access technologies (RATs). In some implementations, transceiver 616 may be equipped with a plurality of antenna ports (not shown) such as, for example, four antenna ports. That is, transceiver 616 may be equipped with multiple transmit antennas and multiple receive antennas for multiple-input multiple-output (MIMO) wireless communications. In some implementations, apparatus 620 may also include a transceiver 626 coupled to processor 622. Transceiver 626 may include a transceiver capable of wirelessly transmitting and receiving data. In some implementations, transceiver 626 may be capable of wirelessly communicating with different types of UEs/wireless networks of different RATs. In some implementations, transceiver 626 may be equipped with a plurality of antenna ports (not shown) such as, for example, four antenna ports. That is, transceiver 626 may be equipped with multiple transmit antennas and multiple receive antennas for MIMO wireless communications.

In some implementations, apparatus 610 may further include a memory 614 coupled to processor 612 and capable of being accessed by processor 612 and storing data therein. In some implementations, apparatus 620 may further include a memory 624 coupled to processor 622 and capable of being accessed by processor 622 and storing data therein. Each of memory 614 and memory 624 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 614 and memory 624 may include a type of read-only memory (ROM) such as mask ROM, programmable ROM (PROM), erasable programmable ROM (EPROM) and/or electrically erasable programmable ROM (EEPROM). Alternatively, or additionally, each of memory 614 and memory 624 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 610 and apparatus 620 may be a communication entity capable of communicating with each other using various proposed schemes in accordance with the present disclosure. For illustrative purposes and without limitation, a description of capabilities of apparatus 610, as a UE (e.g., UE 110), and apparatus 620, as a network node (e.g., network node 125) of a wireless network (e.g., wireless network 120 as a 5G/NR mobile network), is provided below.

Under a proposed scheme with respect to conditions on LBT impact on MAC counters in mobile communications in accordance with the present disclosure, processor 612 of apparatus 610, implemented in a UE (e.g., UE 110), may determine a status of an LBT failure detection and recovery feature. Additionally, processor 612 may conditionally increment a counter in a procedure based on the status of the LBT failure detection and recovery feature. Moreover, processor 612 may execute one or more recovery actions responsive to the counter reaching a threshold.

In some implementations, in conditionally incrementing the counter, processor 612 may conditionally increment a preamble transmission counter in a RA procedure.

In some implementations, in conditionally incrementing the counter, processor 612 may not increment the preamble transmission counter responsive to: (a) the LBT failure detection and recovery feature being configured; and (b) an LBT failure indication being received with respect to the RA procedure. In some implementations, the RA procedure may include a 4-step RA procedure. In such cases, the LBT failure indication may include an LBT failure indication for a last random access preamble transmission. Alternatively, the RA procedure may include a 2-step RA procedure. In such cases, the LBT failure indication may include an LBT failure indication for a last MsgA random access preamble transmission.

In some implementations, in conditionally incrementing the counter, processor 612 may increment the preamble transmission counter responsive to: (a) the LBT failure detection and recovery feature being not configured; and (b) an LBT failure indication being received with respect to the RA procedure. In some implementations, the RA procedure may include a 4-step RA procedure. In such cases, the LBT failure indication may include an LBT failure indication for a last random access preamble transmission. Alternatively, the RA procedure may include a 2-step RA procedure. In such cases, the LBT failure indication may include an LBT failure indication for a last MsgA random access preamble transmission.

In some implementations, in conditionally incrementing the counter, processor 612 may conditionally increment a SR counter in a SR procedure.

In some implementations, in conditionally incrementing the counter, processor 612 may not increment the SR counter responsive to: (a) the LBT failure detection and recovery feature being configured; and (b) an LBT failure indication being received with respect to a SR transmission in the SR procedure.

In some implementations, in conditionally incrementing the counter, processor 612 may increment the SR counter responsive to: (a) the LBT failure detection and recovery feature being not configured; and (b) an LBT failure indication being received with respect to a SR transmission in the SR procedure.

Under another proposed scheme with respect to conditions on LBT impact on MAC counters in mobile communications in accordance with the present disclosure, processor 612 of apparatus 610, implemented in a UE (e.g., UE 110), may determine a status of an LBT failure detection and recovery feature. Additionally, processor 612 may conditionally increment a preamble transmission counter in a RA procedure based on the status of the LBT failure detection and recovery feature.

In some implementations, in conditionally incrementing the preamble transmission counter, processor 612 may not increment the preamble transmission counter responsive to: (a) the LBT failure detection and recovery feature being configured; and (b) an LBT failure indication being received with respect to the RA procedure. In such cases, in an event that the RA procedure involves a 4-step RA procedure, the LBT failure indication may include an LBT failure indication for a last random access preamble transmission. Alternatively, in an event that the RA procedure involves a 2-step RA procedure, the LBT failure indication may include an LBT failure indication for a last MsgA random access preamble transmission.

In some implementations, in conditionally incrementing the preamble transmission counter, processor 612 may increment the preamble transmission counter responsive to: (a) the LBT failure detection and recovery feature being not configured; and (b) an LBT failure indication being received with respect to the RA procedure. In such cases, in an event that the RA procedure involves a 4-step RA procedure, the LBT failure indication may include an LBT failure indication for a last random access preamble transmission. Alternatively, in an event that the RA procedure involves a 2-step RA procedure, the LBT failure indication may include an LBT failure indication for a last MsgA random access preamble transmission.

Under yet another proposed scheme with respect to conditions on LBT impact on MAC counters in mobile communications in accordance with the present disclosure, processor 612 of apparatus 610, implemented in a UE (e.g., UE 110), may determine a status of an LBT failure detection and recovery feature. Additionally, processor 612 may conditionally increment a SR counter in a SR procedure based on the status of the LBT failure detection and recovery feature.

In some implementations, in conditionally incrementing the SR counter, processor 612 may not increment the SR counter responsive to: (a) the LBT failure detection and recovery feature being configured; and (b) an LBT failure indication being received with respect to the SR procedure.

In some implementations, in conditionally incrementing the SR counter, processor 612 may increment the SR counter responsive to: (a) the LBT failure detection and recovery feature being not configured; and (b) an LBT failure indication being received with respect to the SR procedure.

Illustrative Processes

Figure 7:
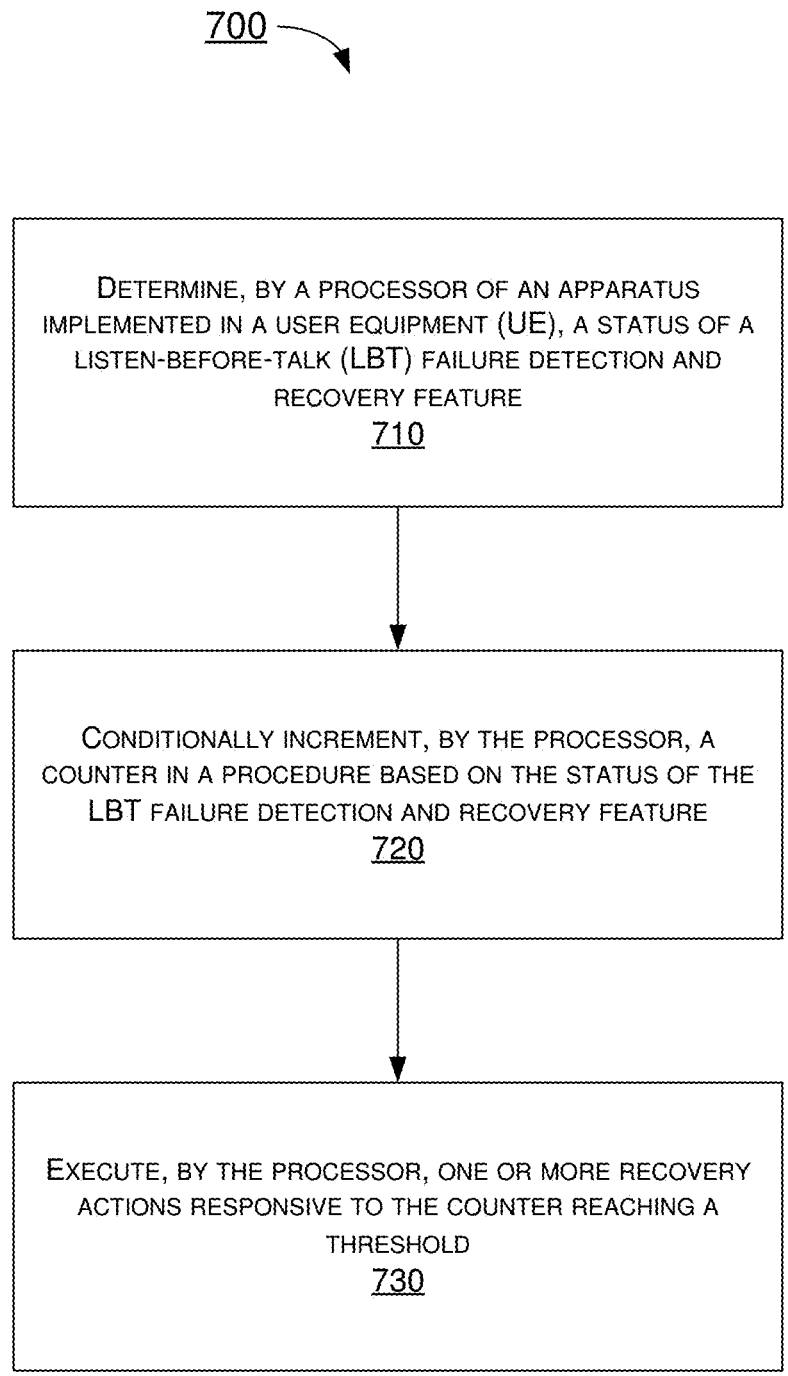
FIG. 7 is a flowchart of an example process in accordance with an implementation of the present disclosure.

FIG. 7 illustrates an example process 700 in accordance with an implementation of the present disclosure. Process 700 may represent an aspect of implementing various proposed designs, concepts, schemes, systems and methods described above, whether partially or entirely, including those pertaining to FIG. 1~FIG. 6. More specifically, process 700 may represent an aspect of the proposed concepts and schemes pertaining to conditions on LBT impact on MAC counters in mobile communications. Process 700 may include one or more operations, actions, or functions as illustrated by one or more of blocks 710, 720 and 730. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively in a different order. Furthermore, one or more of the blocks/sub-blocks of process 700 may be executed iteratively. Process 700 may be implemented by or in apparatus 610 and apparatus 620 as well as any variations thereof. Solely for illustrative purposes and without limiting the scope, process 700 is described below in the context of apparatus 610 as a UE (e.g., UE 110) and apparatus 620 as a communication entity such as a network node or base station (e.g., network node 125) of a wireless network (e.g., wireless network 120). Process 700 may begin at block 710.

At 710, process 700 may involve processor 612 of apparatus 610, implemented in a UE (e.g., UE 110), determining a status of an LBT failure detection and recovery feature. Process 700 may proceed from 710 to 720.

At 720, process 700 may involve processor 612 conditionally incrementing a counter in a procedure based on the status of the LBT failure detection and recovery feature. Process 700 may proceed from 720 to 730.

At 730, process 700 may involve processor 612 executing one or more recovery actions responsive to the counter reaching a threshold.

In some implementations, in conditionally incrementing the counter, process 700 may involve processor 612 conditionally incrementing a preamble transmission counter in a RA procedure.

In some implementations, in conditionally incrementing the counter, process 700 may involve processor 612 not incrementing the preamble transmission counter responsive to: (a) the LBT failure detection and recovery feature being configured; and (b) an LBT failure indication being received with respect to the RA procedure. In some implementations, the RA procedure may include a 4-step RA procedure. In such cases, the LBT failure indication may include an LBT failure indication for a last random access preamble transmission. Alternatively, the RA procedure may include a 2-step RA procedure. In such cases, the LBT failure indication may include an LBT failure indication for a last MsgA random access preamble transmission.

In some implementations, in conditionally incrementing the counter, process 700 may involve processor 612 incrementing the preamble transmission counter responsive to: (a) the LBT failure detection and recovery feature being not configured; and (b) an LBT failure indication being received with respect to the RA procedure. In some implementations, the RA procedure may include a 4-step RA procedure. In such cases, the LBT failure indication may include an LBT failure indication for a last random access preamble transmission. Alternatively, the RA procedure may include a 2-step RA procedure. In such cases, the LBT failure indication may include an LBT failure indication for a last MsgA random access preamble transmission.

In some implementations, in conditionally incrementing the counter, process 700 may involve processor 612 conditionally incrementing a SR counter in a SR procedure.

In some implementations, in conditionally incrementing the counter, process 700 may involve processor 612 not incrementing the SR counter responsive to: (a) the LBT failure detection and recovery feature being configured; and (b) an LBT failure indication being received with respect to a SR transmission in the SR procedure.

In some implementations, in conditionally incrementing the counter, process 700 may involve processor 612 incrementing the SR counter responsive to: (a) the LBT failure detection and recovery feature being not configured; and (b) an LBT failure indication being received with respect to a SR transmission in the SR procedure.

Figure 8:
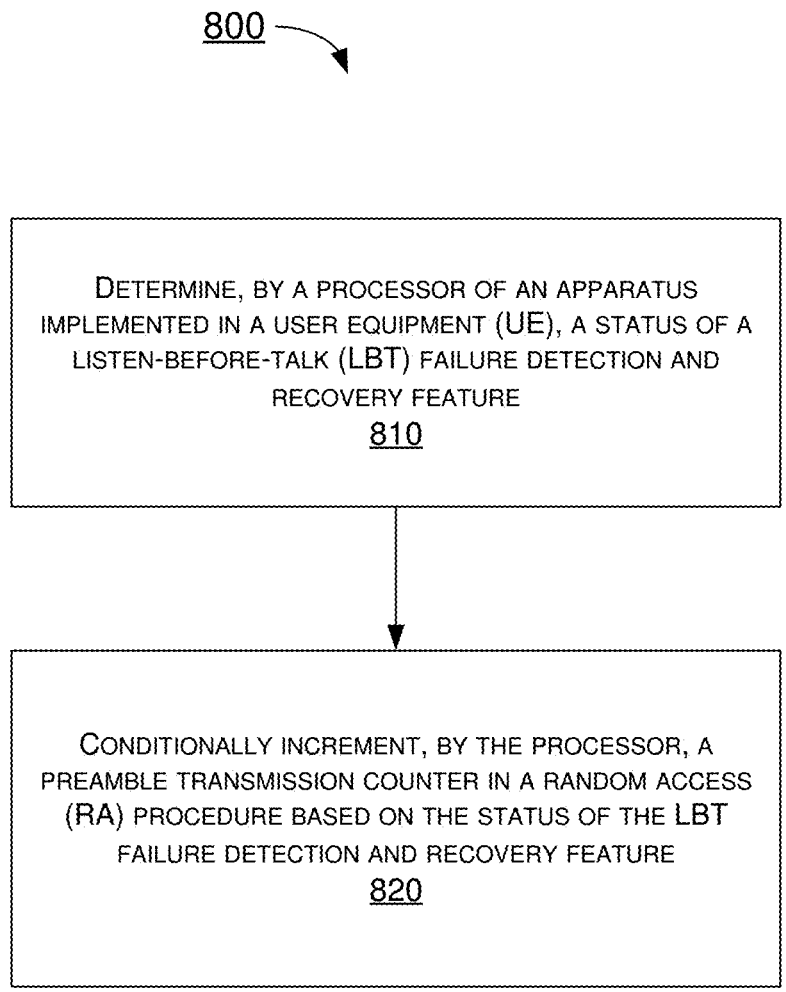
FIG. 8 is a flowchart of an example process in accordance with an implementation of the present disclosure.

FIG. 8 illustrates an example process 800 in accordance with an implementation of the present disclosure. Process 800 may represent an aspect of implementing various proposed designs, concepts, schemes, systems and methods described above, whether partially or entirely, including those pertaining to FIG. 1~FIG. 6. More specifically, process 800 may represent an aspect of the proposed concepts and schemes pertaining to conditions on LBT impact on MAC counters in mobile communications. Process 800 may include one or more operations, actions, or functions as illustrated by one or more of blocks 810 and 820. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively in a different order. Furthermore, one or more of the blocks/sub-blocks of process 800 may be executed iteratively. Process 800 may be implemented by or in apparatus 610 and apparatus 620 as well as any variations thereof. Solely for illustrative purposes and without limiting the scope, process 800 is described below in the context of apparatus 610 as a UE (e.g., UE 110) and apparatus 620 as a communication entity such as a network node or base station (e.g., network node 125) of a wireless network (e.g., wireless network 120). Process 800 may begin at block 810.

At 810, process 800 may involve processor 612 of apparatus 610, implemented in a UE (e.g., UE 110), determining a status of an LBT failure detection and recovery feature. Process 800 may proceed from 810 to 820.

At 820, process 800 may involve processor 612 conditionally incrementing a preamble transmission counter in a RA procedure based on the status of the LBT failure detection and recovery feature.

In some implementations, in conditionally incrementing the preamble transmission counter, process 800 may involve processor 612 not incrementing the preamble transmission counter responsive to: (a) the LBT failure detection and recovery feature being configured; and (b) an LBT failure indication being received with respect to the RA procedure. In such cases, in an event that the RA procedure involves a 4-step RA procedure, the LBT failure indication may include an LBT failure indication for a last random access preamble transmission. Alternatively, in an event that the RA procedure involves a 2-step RA procedure, the LBT failure indication may include an LBT failure indication for a last MsgA random access preamble transmission.

In some implementations, in conditionally incrementing the preamble transmission counter, process 800 may involve processor 612 incrementing the preamble transmission counter responsive to: (a) the LBT failure detection and recovery feature being not configured; and (b) an LBT failure indication being received with respect to the RA procedure. In such cases, in an event that the RA procedure involves a 4-step RA procedure, the LBT failure indication may include an LBT failure indication for a last random access preamble transmission. Alternatively, in an event that the RA procedure involves a 2-step RA procedure, the LBT failure indication may include an LBT failure indication for a last MsgA random access preamble transmission.

Figure 9:
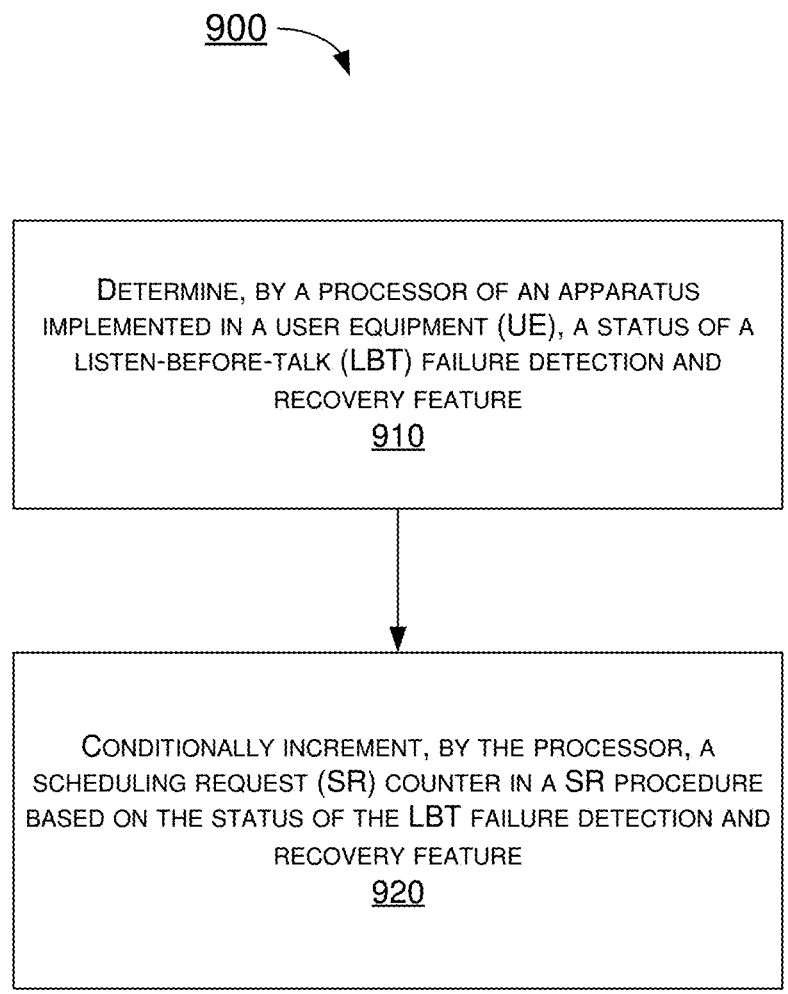
FIG. 9 is a flowchart of an example process in accordance with an implementation of the present disclosure.

FIG. 9 illustrates an example process 900 in accordance with an implementation of the present disclosure. Process 900 may represent an aspect of implementing various proposed designs, concepts, schemes, systems and methods described above, whether partially or entirely, including those pertaining to FIG. 1~FIG. 6. More specifically, process 900 may represent an aspect of the proposed concepts and schemes pertaining to conditions on LBT impact on MAC counters in mobile communications. Process 900 may include one or more operations, actions, or functions as illustrated by one or more of blocks 910 and 920. Although illustrated as discrete blocks, various blocks of process 900 may be divided into additional blocks, combined into fewer blocks, or eliminated, depending on the desired implementation. Moreover, the blocks/sub-blocks of process 900 may be executed in the order shown in FIG. 9 or, alternatively in a different order. Furthermore, one or more of the blocks/sub-blocks of process 900 may be executed iteratively. Process 900 may be implemented by or in apparatus 610 and apparatus 620 as well as any variations thereof. Solely for illustrative purposes and without limiting the scope, process 900 is described below in the context of apparatus 610 as a UE (e.g., UE 110) and apparatus 620 as a communication entity such as a network node or base station (e.g., network node 125) of a wireless network (e.g., wireless network 120). Process 900 may begin at block 910.

At 910, process 900 may involve processor 612 of apparatus 610, implemented in a UE (e.g., UE 110), determining a status of an LBT failure detection and recovery feature. Process 900 may proceed from 910 to 920.

At 920, process 900 may involve processor 612 conditionally incrementing a SR counter in a SR procedure based on the status of the LBT failure detection and recovery feature.

In some implementations, in conditionally incrementing the SR counter, process 900 may involve processor 612 not incrementing the SR counter responsive to: (a) the LBT failure detection and recovery feature being configured; and (b) an LBT failure indication being received with respect to the SR procedure.

In some implementations, in conditionally incrementing the SR counter, process 900 may involve processor 612 incrementing the SR counter responsive to: (a) the LBT failure detection and recovery feature being not configured; and (b) an LBT failure indication being received with respect to the SR procedure.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    determining, by a processor of an apparatus implemented in a user equipment (UE), a status of a listen-before-talk (LBT) failure detection and recovery feature; and
    conditionally incrementing, by the processor, a counter in a procedure based on the status of the LBT failure detection and recovery feature,
    wherein the conditionally incrementing the counter comprises conditionally incrementing a preamble transmission counter in a random access (RA) procedure, and
    wherein the conditionally incrementing the counter further comprises incrementing the preamble transmission counter responsive to:
        the LBT failure detection and recovery feature being not configured; and
        an LBT failure indication being received with respect to the RA procedure.
2. The method of claim 1, wherein the conditionally incrementing the counter further comprises not incrementing the preamble transmission counter responsive to:
    the LBT failure detection and recovery feature being configured; and
    an LBT failure indication being received with respect to the RA procedure.
3. The method of claim 2, wherein the RA procedure comprises a 4-step RA procedure, and wherein the LBT failure indication comprises an LBT failure indication for a last random access preamble transmission.
4. The method of claim 2, wherein the RA procedure comprises a 2-step RA procedure, and wherein the LBT failure indication comprises an LBT failure indication for a last message A (MsgA) random access preamble transmission.
5. The method of claim 1, wherein the RA procedure comprises a 4-step RA procedure, and wherein the LBT failure indication comprises an LBT failure indication for a last random access preamble transmission.
6. The method of claim 1, wherein the RA procedure comprises a 2-step RA procedure, and wherein the LBT failure indication comprises an LBT failure indication for a last message A (MsgA) random access preamble transmission.
7. The method of claim 1, wherein the conditionally incrementing the counter comprises conditionally incrementing a scheduling request (SR) counter in a SR procedure.
8. The method of claim 7, wherein the conditionally incrementing the counter comprises not incrementing the SR counter responsive to:
    the LBT failure detection and recovery feature being configured; and
    an LBT failure indication being received with respect to a SR transmission in the SR procedure.
9. The method of claim 7, wherein the conditionally incrementing the counter comprises incrementing the SR counter responsive to:
    the LBT failure detection and recovery feature being not configured; and
    an LBT failure indication being received with respect to a SR transmission in the SR procedure.
10. The method of claim 1, further comprising:
    executing, by the processor, one or more recovery actions responsive to the counter reaching a threshold.
11. A method, comprising:
    determining, by a processor of an apparatus implemented in a user equipment (UE), a status of a listen-before-talk (LBT) failure detection and recovery feature; and
    conditionally incrementing, by the processor, a preamble transmission counter in a random access (RA) procedure based on the status of the LBT failure detection and recovery feature,
    wherein the conditionally incrementing the preamble transmission counter comprises incrementing the preamble transmission counter responsive to:
        the LBT failure detection and recovery feature being not configured; and
        an LBT failure indication being received with respect to the RA procedure.
12. The method of claim 11, wherein the conditionally incrementing the preamble transmission counter further comprises not incrementing the preamble transmission counter responsive to:
    the LBT failure detection and recovery feature being configured; and
    an LBT failure indication being received with respect to the RA procedure.
13. The method of claim 12, wherein
    in an event that the RA procedure comprises a 4-step RA procedure, the LBT failure indication comprises an LBT failure indication for a last random access preamble transmission, and
    in an event that the RA procedure comprises a 2-step RA procedure, the LBT failure indication comprises an LBT failure indication for a last message A (MsgA) random access preamble transmission.

14. The method of claim 11, wherein in an event that the RA procedure comprises a 4-step RA procedure, the LBT failure indication comprises an LBT failure indication for a last random access preamble transmission, and in an event that the RA procedure comprises a 2-step RA procedure, the LBT failure indication comprises an LBT failure indication for a last message A (MsgA) random access preamble transmission.

15. A method, comprising:

determining, by a processor of an apparatus implemented in a user equipment (UE), a status of a listen-before-talk (LBT) failure detection and recovery feature; and conditionally incrementing, by the processor, a scheduling request (SR) counter in a SR procedure based on the status of the LBT failure detection and recovery feature, wherein the conditionally incrementing the SR counter comprises incrementing the SR counter responsive to:
  the LBT failure detection and recovery feature being not configured; and
  an LBT failure indication being received with respect to the SR procedure.

16. The method of claim 15, wherein the conditionally incrementing the SR counter further comprises not incrementing the SR counter responsive to:

the LBT failure detection and recovery feature being configured; and an LBT failure indication being received with respect to the SR procedure.

\* \* \* \* \*